(12) United States Patent
Welfley (10) Patent No.: US 6,810,114 B2
(45) Date of Patent: Oct. 26, 2004

(54) SYSTEM FOR UPDATING A VOICEMAIL NETWORK

(75) Inventor: Randall W Welfley, Alpharetta, GA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 83 days.

(21) Appl. No.: 09/902,036

(22) Filed: Jul. 10, 2001

(65) Prior Publication Data

US 2003/0012349 A1 Jan. 16, 2003

(51) Int. Cl.[7] .............................................. H04M 11/00
(52) U.S. Cl. ............................. 379/88.18; 379/20.12; 455/413
(58) Field of Search .................... 379/88.13, 88.16, 379/88.17, 88.18, 201.03, 201.12; 370/401; 704/270.1; 455/413

(56) References Cited

U.S. PATENT DOCUMENTS

| | | | |
|---|---|---|---|
| 4,933,967 A | | 6/1990 | Lo et al. |
| 5,555,291 A | | 9/1996 | Inniss et al. ............. 379/88.13 |
| 5,909,483 A | * | 6/1999 | Weare et al. ............ 379/88.18 |
| 5,963,618 A | * | 10/1999 | Porter ..................... 704/270.1 |
| 6,263,064 B1 | | 7/2001 | O'Neal et al. ........... 379/88.16 |
| 6,269,100 B1 | | 7/2001 | Christie et al. ............. 370/401 |
| 6,337,899 B1 | | 1/2002 | Alcendor et al. ........ 379/88.17 |
| 6,493,434 B1 | | 12/2002 | Desmond et al. ........ 379/88.17 |
| 2001/0011303 A1 | | 8/2001 | Chang et al. |

* cited by examiner

*Primary Examiner*—Fan Tsang
*Assistant Examiner*—Gerald Gauthier (57) ABSTRACT

The present invention provides a system of updating voicemail systems on a voicemail system network to reflect changes to the configuration of a voicemail system on the voicemail system network. A voicemail manager is provided and is configured to access a voicemail system in accordance with data stored in an associated administrative database and to upload change data to a configuration database associated with the voicemail system.

25 Claims, 7 Drawing Sheets

SYSTEM FOR UPDATING A VOICEMAIL NETWORK

TECHNICAL FIELD

The present invention is generally related to voicemail system networks and more particularly, to a system for updating configuration information on a voicemail system relevant to a remote voicemail system.

BACKGROUND OF THE INVENTION

Voicemail systems are in wide use in many organizations. Voicemail systems, such as, for example, the Octel™ Aria™ voicemail system work in conjunction with a private branch exchange telephone system (PBX system) and allow callers to leave a voice message for a called party when the called party is not available, without the involvement of a third party in taking a message for the called party.

These voicemail systems typically provide a voicemail box that is associated with a particular telephone line or extension number (extension) on the PBX system. These extensions may be, for example, extensions used by a particular organization, portion of an organization or within a particular facility or area of a facility.

A typical voicemail system routes a caller to a voicemail box after the called extension has been rung a predetermined number of times. The caller may then leave a voice message that is placed in a voicemail box associated with the called extension for subsequent retrieval by the called party. These voicemail systems also often provide for such functions as forwarding of voicemail messages to other voicemail boxes on the voicemail system or broadcasting of a voice message to a predetermined range or list of voicemail boxes on the voicemail system.

As many larger organizations have facilities and personnel located in various locations throughout the world, it is common for the various voicemail systems that service particular facilities or groups within the organization be networked so that the various voicemail systems throughout the organization can be accessible to a user as if each voicemail box was on the same voicemail system. This is often referred to as a voicemail system network. In order to do this, each voicemail system on the network must be configured to know and recognize the configurations of each of the other voicemail systems on the voicemail system network. Voicemail system networks may include up to several hundred voicemail systems on the same voicemail system network.

As personnel or groups within the organization change, telephone lines and/or extensions on the PBX system may be added or removed as may be necessary. Accordingly, the voicemail system associated with the particular PBX system must be updated to reflect the deleted extensions and provide for an associated voicemail box for any new extensions. Updating the voicemail system to reflect these changes typically requires the attention of a voicemail system administrator/technician, to carry out an update of configuration data to reflect the changes within the PBX system and associated voicemail system. Where the voicemail system is part of a voicemail system network, the other voicemail systems on the network must be updated as well to reflect the changes in the voicemail system. In a typical voicemail system network, this requires that each voicemail system on the network be accessed and provided with data reflecting the changes to the voicemail system that has been changed. As this requires the manual attention of a technician or system administrator, a great deal of time is required to carry out implementation of the changes for each voicemail system on the network.

Thus, a heretofore unaddressed need exists in the industry to address the aforementioned deficiencies and inadequacies.

SUMMARY OF THE INVENTION

The present invention provides a system for updating a network configuration database associated with a voicemail system in a voicemail system network.

Briefly described, in architecture, the system can be implemented as follows. A controller is provided. Further, an interface is provided for accessing an associated administrative database. The administrative database composes an administrative record that specifies a first voicemail system and connection data for accessing an administrative interface associated with the first voicemail system. A means for receiving change data is provided. The change data reflects modifications made to a second voicemail system. The controller is configured to generate a change data record in accordance with said received change data.

The present invention can also be viewed as providing a method updating a network configuration database associated with a voicemail system in a voicemail system network.

In this regard, the method can be broadly summarized by the following steps: receiving change data reflecting changes made to a first voicemail system; and generating a change data record based upon said change data. A network configuration database may be accessed via an administrative interface in accordance with connection data specified by an administrative database. The network configuration database may be modified in accordance with the change data record.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

The present invention provides a voicemail management system for updating voicemail systems on a shared voicemail network with connection data relevant to a particular voicemail system on the shared voicemail network.

Figure 1A:
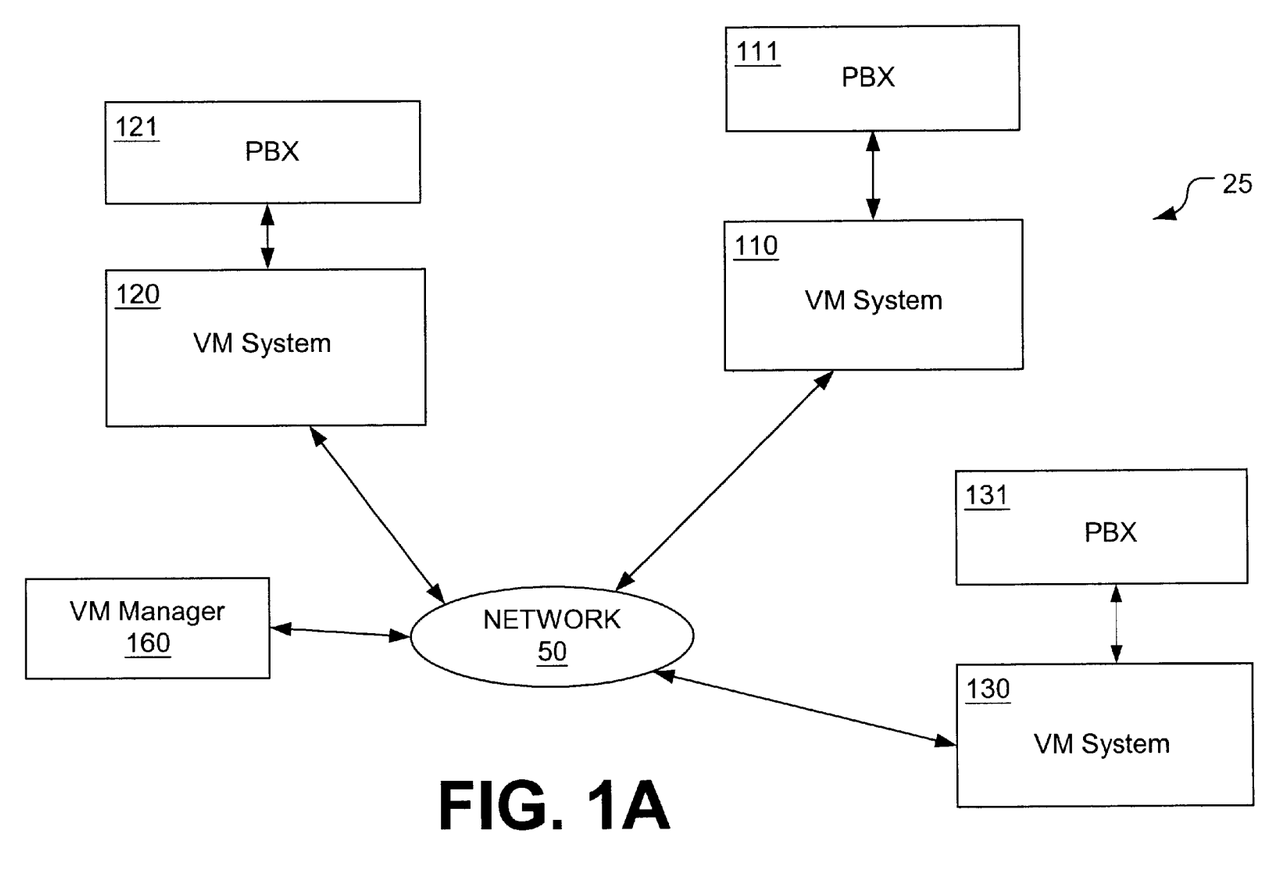
FIG. 1A is a block diagram illustrating a voicemail system network 25.

FIG. 1A illustrates a voicemail system network 25. In this example, three voicemail systems (VM systems) 110, 120 and 130 are provided. These voicemails systems 110, 120 and 130 are connected to and accessible to each other via a network 50.

A voicemail manager (VM Manager) 160 is provided for accessing and updating the voicemail systems on the network 50 voicemail, i.e., voicemail systems 110, 120 and 130. Each of these voicemail systems 110, 120 and 130 constitute a node on the voicemail system network 25. Each voicemail system 110, 120 and 130 on the voicemail network 25 may also be referred to as a networked voicemail system.

Each voicemail system 110, 120 and 130 is preferably associated with a private branch exchange telephone system (PBX system) 111, 121 and 131. Each PBX system includes multiple telephone extensions (not shown).

Network 50 may be, for example, but not limited to, a local area network (LAN), wide area network (WAN) or the Internet. Further, network 50 may be a plain old telephone system (POTS) or integrated digital services network (ISDN). Network 50 may also be a combination of LAN, WAN, Internet or POTS networks.

Figure 1B:
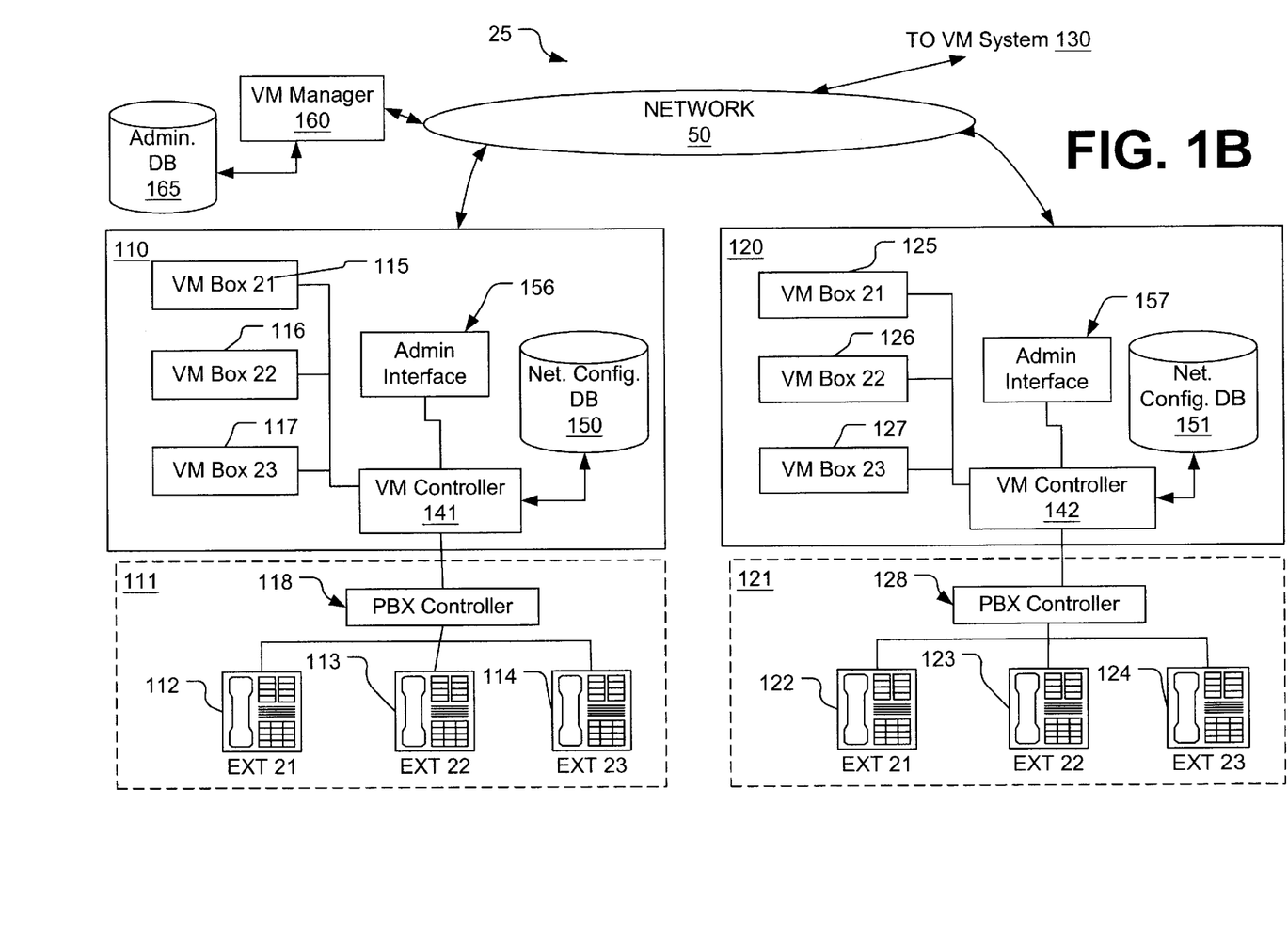
FIG. 1B is a further illustration of voicemail system network 25.

FIG. 1B provides a further illustration of voicemail system network 25. In this illustration voicemail systems 110 and 120 are shown in greater detail for purposes of discussion. It will be understood that discussions concerning voicemail systems 110 and 120 are applicable to all voicemail systems on the network 50 unless otherwise noted. Voicemail system 110 is associated with a private branch exchange telephone system (PBX system) 111. Voicemail system 120 is associated with a PBX system 121.

PBX system 111 includes a PBX controller 118 and telephone extensions 112, 113 and 114. Voicemail system 110 includes a voicemail controller (VM Controller) 141 and provides for voicemail boxes 115, 116 and 117. PBX system 121 also includes a PBX controller 128 and telephone extensions 122, 123 and 124. Each extension 122, 123 and 124 of the PBX system 111 is serviced by an associated voicemail box 115, 116 and 117, respectively, of the voicemail system 110.

Voicemail system 110 includes a voicemail controller (VM Controller) 141 and provides for voicemail boxes 115, 116 and 117. An administrative interface 156 is provided for granting a terminal access to the voicemail system 110 for the purpose of, for example, making changes or modifications to the configuration of the voicemail system 110, as well as accessing an associated network configuration database 150. Administrative interface 156 may be implemented as a hardware interface. Alternatively, the functions of administrative interface 157 may be carried out via software associated with the voicemail system 110.

Although not shown, voicemail system 110 may also include a user interface via which a user may access the voicemail system 110 from a PBX system 111 to, for example, retrieve voicemail messages. Additionally, voicemail system 110 may also include a messaging interface via which the voicemail system 110 may send or receive communications from other voicemail systems on the voicemail system network 25. The user interface, as well as messaging interface, may be implemented as a hardware interface. Alternatively, the functions of user interface, as well as messaging interface may be carried out via software associated with the voicemail system 110.

Voicemail system 120 includes a voicemail controller (VM Controller) 142 and provides for voicemail boxes 125, 126 and 127. An administrative interface 157 is provided for granting a terminal access to the voicemail system 120 for the purpose of, for example, making changes or modifications to the configuration of the voicemail system 120, as well as accessing an associated network configuration database 151. Administrative interface 157 may be implemented as a hardware interface. Alternatively, the functions of administrative interface 157 may be carried out via software associated with the voicemail system 120. VM manager 160 may be configured to facilitate remote access to the administrative interface 157 via, for example, dial-up or network connection.

Voicemail system 120 may also include a user interface (not shown) via which a user may access the voicemail system 120 from a PBX system 121 to, for example, retrieve voicemail messages. Additionally, voicemail system 120 may also include a messaging interface (not shown) via which the voicemail system 120 may send or receive communications from other voicemail systems on the voicemail system network 25. The user interface, as well as messaging interface, may be implemented as a hardware interface. Alternatively, the functions of user interface, as well as messaging interface may be carried out via software associated with the voicemail system 120.

PBX controllers 118 and 128 are each configured to route incoming calls to the voicemail systems 110 and 120, respectively, after a predetermined number of unanswered rings of an extension 112, 113, 114 or 122, 123, 124, respectively.

Voicemail system 110 is associated with a network configuration database 150 for storing configuration records associated with other voicemail systems on the network 50. Voicemail system 120 is associated with a network configuration database 151.

VM controller 141 is configured to carry out the functions associated with routing an unanswered call received from the PBX system 111 to a voicemail box 115, 116 or 117 associated with the telephone extension 112, 113 or 114 to which the call was directed. The VM controller 141 also provides for broadcasting and forwarding of voice messages from one voicemail box to another voicemail box on the voicemail system 25.

VM controller 142 is configured to carry out the functions associated with routing an unanswered call received from the PBX system 121 to a voicemail box 125, 126 or 127 associated with the telephone extension 122, 123 or 124 to which the call was directed. The VM controller 144 also provides for broadcasting and forwarding of voice messages from a voicemail box 125, 126 or 127 to another voicemail box on the voicemail system 25. Network configuration databases 150 and 151 are provided for storing configuration information related to VM systems in the voicemail system network 25. A voicemail manager (VM manager) 160 is provided for updating the network configuration database 150 and 151, as well as other VM systems on the voicemail system network 25 to reflect changes in the configuration of a VM system. Voicemail systems 110 and 120 are preferably configured to access and communicate with other voicemail systems via network 50.

Figure 3A:
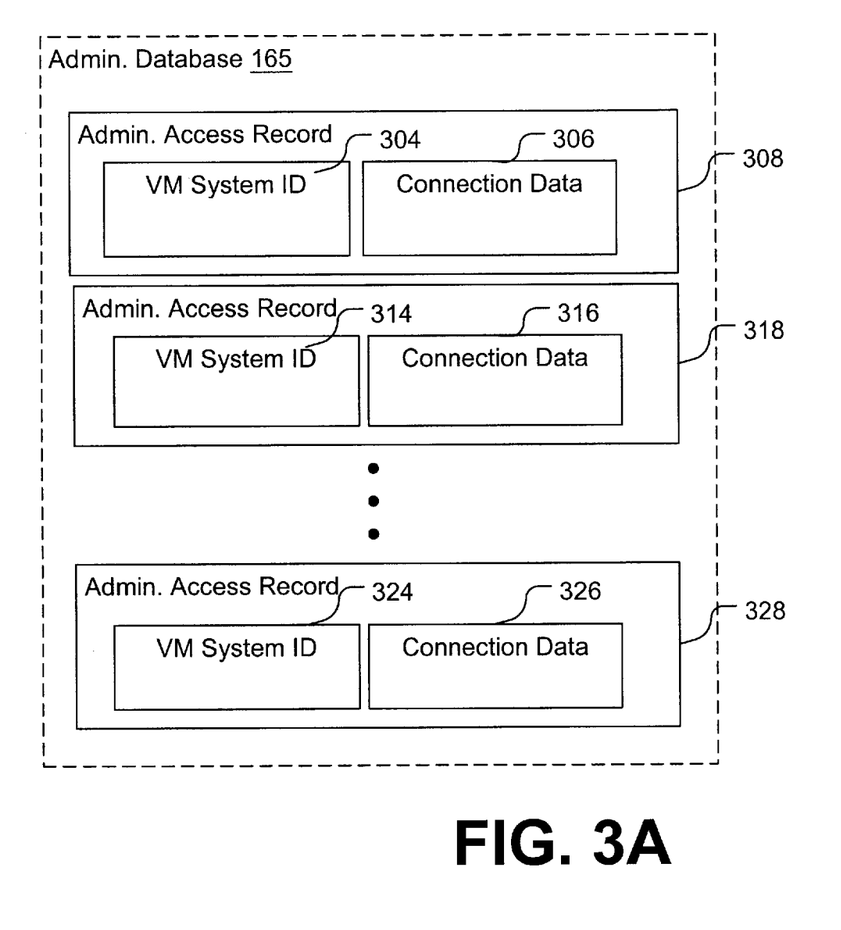
FIG. 3A is a diagram illustrating a administrative database 165.

In this example, voicemail system 120 is registered with voicemail system 110 as being a part of the same voicemail system network. The voicemail system 120 is registered with the voicemail system 110 via entry of a configuration record (FIG. 3) associated with the voicemail system 120, into the network configuration database 150. Similarly, voicemail system 110 is registered with the voicemail system 120 via entry of a configuration record associated with the voicemail system 120, into the configuration database 151.

Figure 2A:
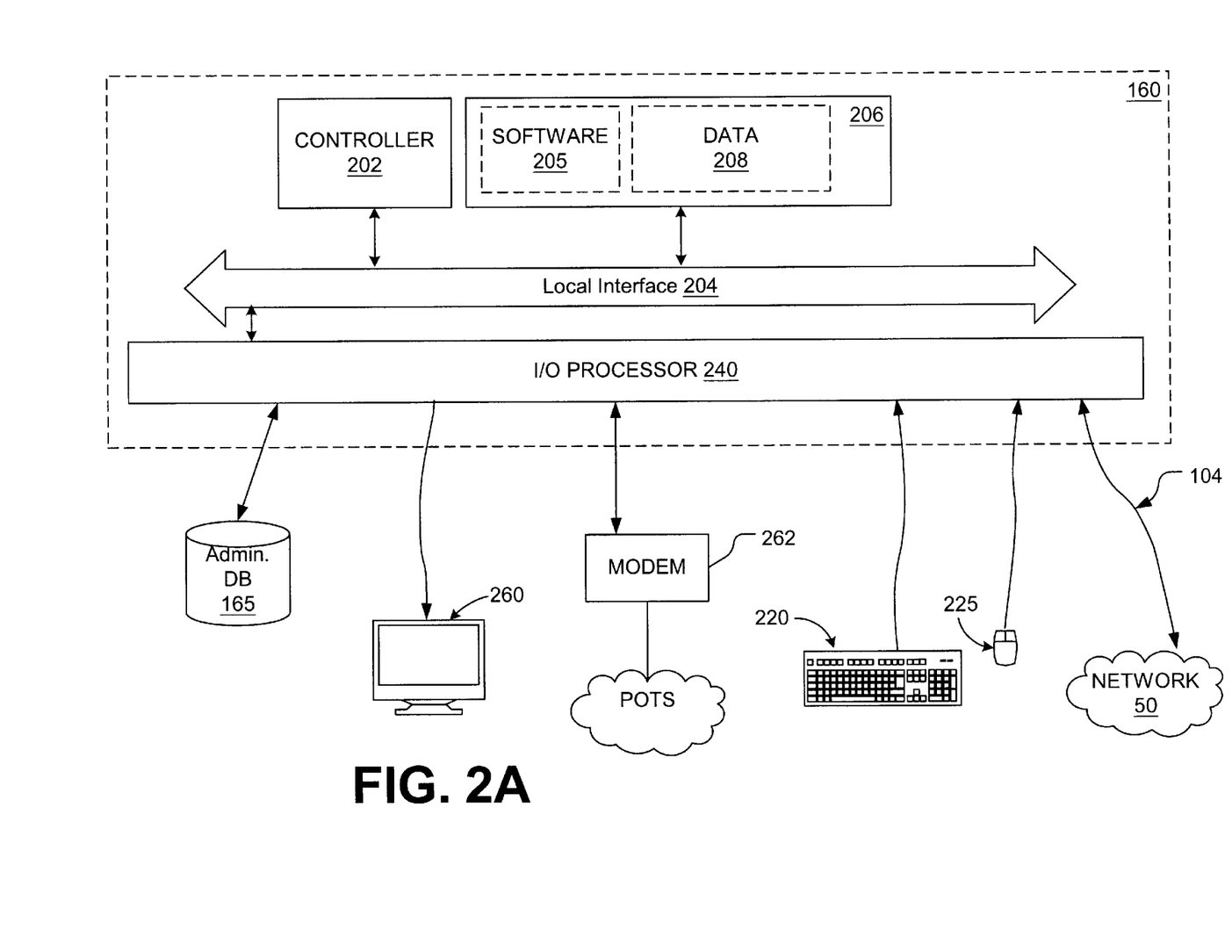
FIG. 2A is a block diagram illustrating a VM manager 160.

FIG. 2A is a diagram illustrating a voicemail manager (VM manager) 160. For purposes of discussions herein, voicemail system 110 will be discussed. It will be recognized and understood that the discussions of the voicemail system 110 are equally applicable to other voicemails systems on the voicemail system network 25, including voicemail system 120. VM manager 160 includes a controller 202 and memory storage 206. Memory storage 206 may include memory for storing software 205 as well as data 208. Software 205 may include software for configuring the VM manager 160 to carry out the process of generating a graphical user interface (GUI) for display, generating a change data record or file based upon received change data, as well as accessing a voicemail system via an associated administrative interface and updating an associated network configuration database in accordance with a change data record or file. A local interface 204 is provided for transferring instructions and data between controller 202 and memory 206. Local interface 204 provides a conduit for transfer of electronic instructions and data from/to the input/output (I/O) processor 240. Further, I/O processor 240 includes provisions for receiving data from input devices such as, for example, a keyboard 220 or pointing device 225. I/O processor 240 also includes an interface 260 for connecting to a network 50. Further I/O processor 240 may include an interface for connecting to a modem 262 for connecting to a telephone system. Administrative database 165 is associated with the VM manager 160 and maybe accessible via the I/O processor 240. Administrative database 165 is preferably stored on memory storage associated with the VM manager 160. Administrative database 165 may also be stored on memory storage 206.

Each extension on the PBX system 111 or 121 is typically assigned a telephone number. This telephone number may include a prefix via which other VM systems will be able to recognize and access the voicemail system. The prefix may be, for example, the first six digits of a telephone number, including, perhaps, the area code and three additional digits.

When changes are made to the configuration of a PBX system, these changes typically need to be communicated with the various VM systems on the voicemail system network 25 so that the new/changed configuration will be recognized via all VM systems on the voicemail system network 25. For example, if new extensions are added to a PBX system 121 and the VM system 120 is updated to provided new VM boxes for the new PBX extensions, other VM systems, for example VM system 110, on the VM system network 25 must be made aware of the existence of these new extensions in order to, for example, allow the other VM systems to forward or broadcast voice messages to the new VM boxes on the VM system 120.

Figure 2B:
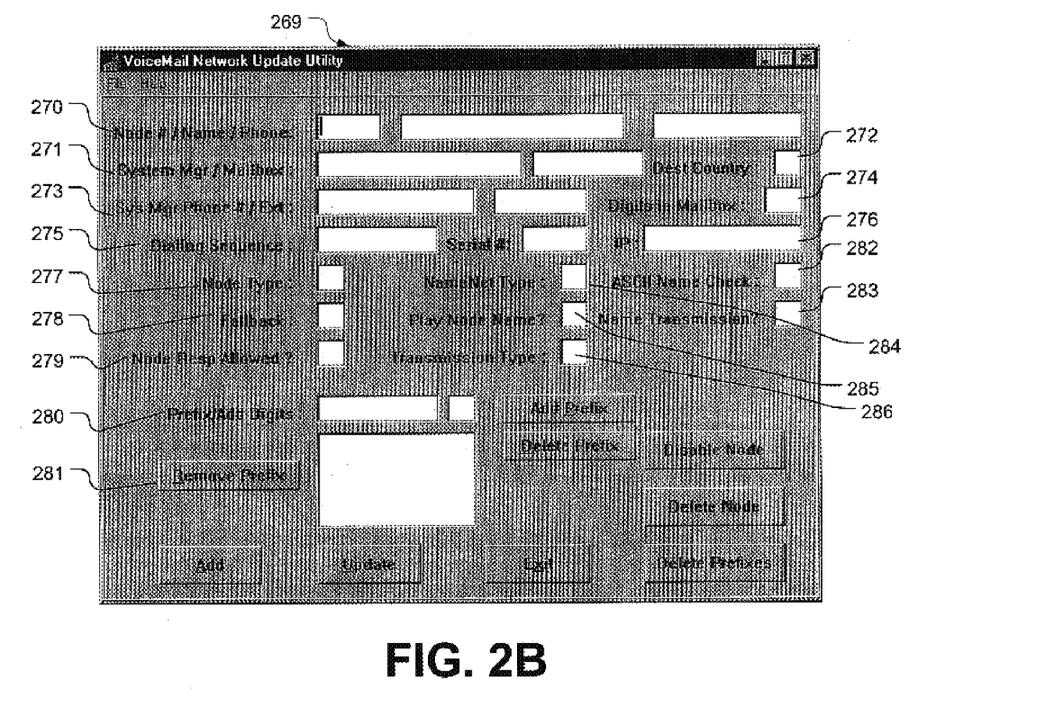
FIG. 2B is a diagram illustrating a GUI 269 associated with VM manager 160.

In one embodiment of VM manager 160, an interface for inputting data representing the changes/modifications that may have been made to a VM system to accommodate changes in an associated PBX system is provided. In one embodiment, data reflecting the changes (change data) to a VM system may be manually entered via, for example, a graphical user interface (GUI) associated with the VM manager 160. FIG. 2B illustrates one embodiment of a GUI 269 associated with the VM manager 160. VM manager 160 may be configured to generate and display the GUI 269 on an associated display device 260 (FIG. 2A).

With reference to FIG. 2B it can be seen that GUI 269 provides for input of such configuration information/changes as node/system identification 270, the name and voicemail box of the system manager 271, the telephone number of the system manager 273, the country in which the voicemail system is located 272, the number of digits in the mail box number 274, the dialing sequence 275, the Internet protocol (IP) address of the voicemail system 282, Transmission Type data 286 that describes whether messages may be sent to the specified node; or whether the node is disabled; Node Type data 277 that describes whether the node is an analog node or a digital node; Data describing the Number of Digits in a Mailbox 274; Data describing the Serial Number 287 associated with the voicemail system on a particular node; Site ID that indicates the phone number that the voicemail system may send to identify itself; Phone Number data 270 that specifies the node's primary telephone number. This may include an area code if it is required to place a call to the system; Extension data that identifies the node's extension number; Dialing Sequence data 275 that specifies a dialing sequence used to call the node; Access Type data that specifies if the node may be dialed directly; Country data 272 that specifies the destination country for the node; Data indicating whether Name Transmission is Allowed 283; or Node Response is Allowed data 279 that specifies whether a remote system is allowed to deliver messages to the voicemail system when the voicemail system initiates the call.

Once change data has been input via, for example, the GUI 269, a change data record (not shown) may be created by the VM manager 160. This change data record reflects change data input via the GUI 269. The change data record may be stored, for example, to memory storage 206, to a separate data file (change data file), or alternatively as a part of the administrative database 165.

VM manager 160 is associated with an administrative database 165. FIG. 3A illustrates administrative database 165. It can be seen that administrative database 165 may include one or more administrative access records 308, 318 through 328. Each administrative record includes an identifier of a voicemail system (VM system ID) 304, 314 or 324 that identifies a particular VM system on the voicemail system network 25. Each administrative access record 308, 318 and 328 includes connection data 306, 316 and 326 respectively. This connection data may include telephone numbers and/or Internet protocol address information via which an administrative interface of the voicemail system identified by the VM system ID can be contacted or otherwise accessed.

In one embodiment, VM manager 160 is configured to access a voicemail system on the voicemail system network 25 when changes have been made to a voicemail system and a change data record has been created to reflect those changes. More particularly, in this embodiment, VM manager is configured to access a VM system identified by an administrative access record, for example, administrative access record 308, in the administrative database 165.

For purposes of discussion consider an example wherein VM system 120 has been changed to add some additional telephone extensions to the PBX system 121 associated with the VM system 120. After these changes are made, the VM system 110 must be changed so that the network configuration database 150 associated with VM system 110 reflects the changes that have been made to the VM system 120, i.e., the addition of new telephone extensions.

In one embodiment, VM manager 160 is configured to generate a change data record that reflects changes that are made to the VM system 120. In a further embodiment, VM manager 160 accesses the administrative database 165 and obtains connection data 306 from, for example, the administrative record 308 (as an example and for purposes of discussion administrative record 308 will be assumed to identify and provided connection data for the VM system 110). This connection data 306 may then be used to access/connect with the VM system 110 identified by the administrative record 308. VM manager 160 is preferably configured to initiate access of the identified VM system 110 via, for example, the network 50. Access is preferably made via an administrative interface 156 of the voicemail system 110. Once the VM manager 160 has accessed the voicemail system 110 via the administrative interface 156, it accesses the network configuration database 150 and causes change data specified by a change data record, preferably stored on memory storage associated with the VM manager 160, reflecting changes to the voicemail system 120 to be uploaded and incorporated into the network configuration database 150. In this way, the VM system 110 is then able to recognize the new telephone extensions on the PBX system 121 and allow for such things as forwarding and/or broadcasting of voice messages to the VM boxes on VM system 120 that are associated with the new telephone extensions of the PBX system 121. VM manager 160 is preferably configured to carry out the update of network configuration databases associated with the VM systems specified or associated with an administrative record 308, 318 or 328 of administrative database 165.

Figure 3B:
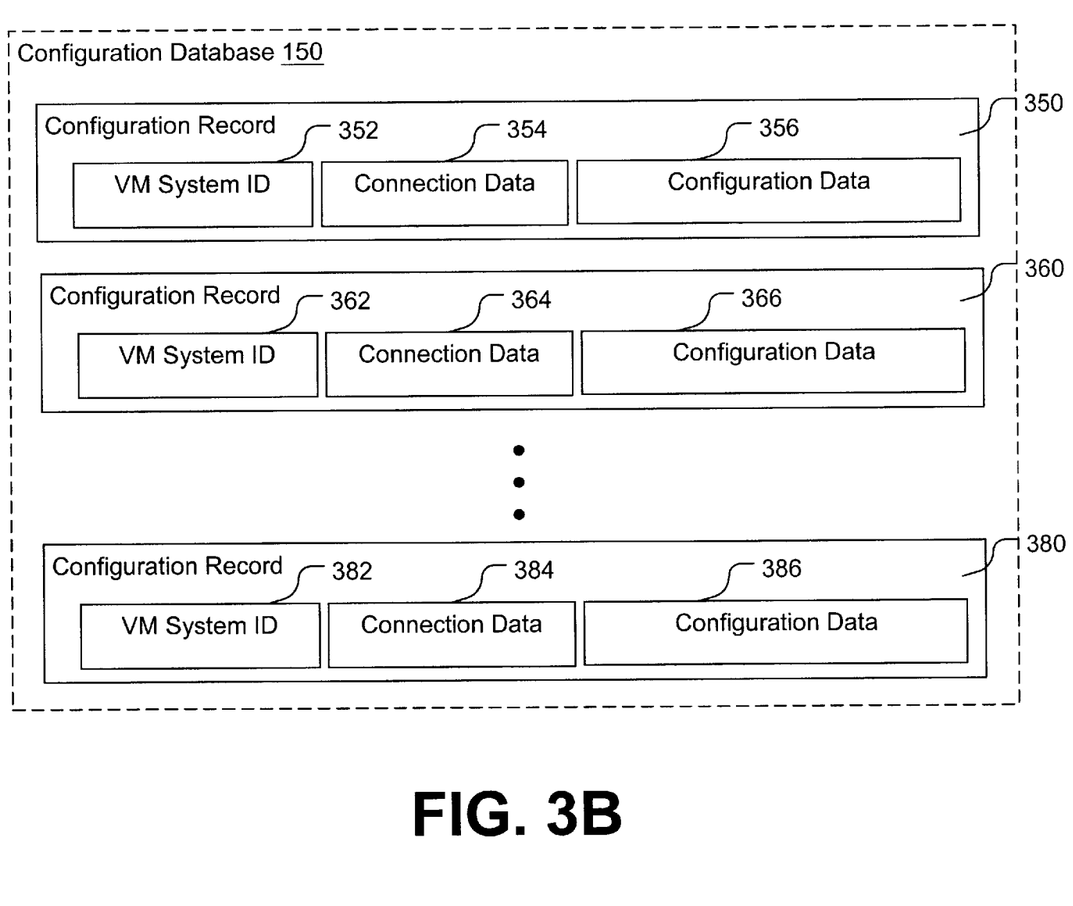
FIG. 3B is a diagram illustrating a network configuration database 150.

Network configuration database 150 includes connection and configuration data relevant to a voicemail system or systems on a particular voicemail system network 25. FIG. 3B illustrates network configuration database 150.

It can be seen that network configuration database 150 includes configuration records 350, 360 and 380. Each configuration record is associated with a particular VM system and reflects the system configuration for that VM system. For example, with respect to configuration record 360, data identifying the particular VM system is provided (VM system ID 352). Connection data 354 is also provided. This connection data 354 may set out, for example, the telephone number or Internet protocol (IP) address via which the VM system identified at 352 may be connected to or accessed. Configuration data 356 is provided that describes the set up/configuration of the VM system identified at 352. For example, this configuration data may include the range or ranges of telephone extensions serviced by the VM system, or pre-fix availability, as well as a schedule that describes when the VM system may be open to receive/accept voicemail messages.

Figure 4:
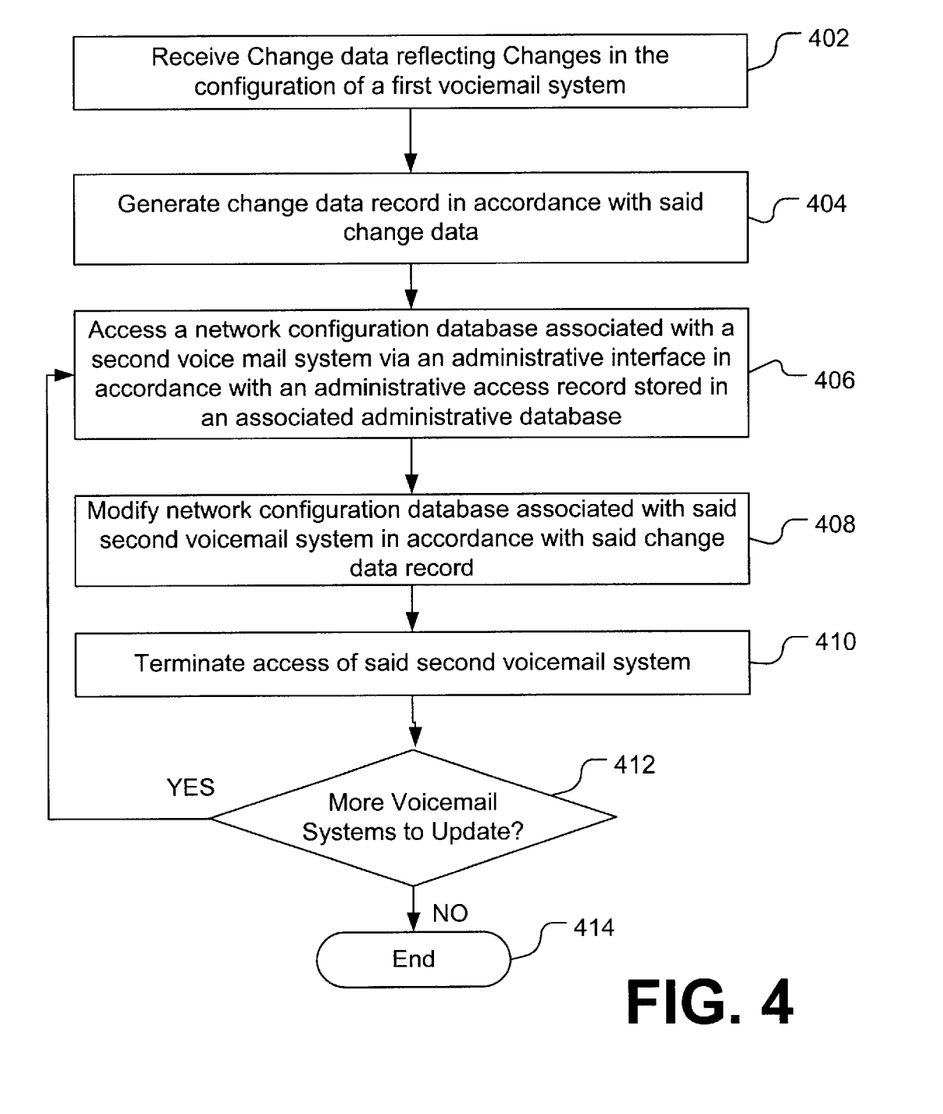
FIG. 4 is a flowchart illustrating the process of updating a voicemail system with configuration data.

The flow chart of FIG. 4 shows the architecture, functionality, and operation of a possible implementation of the VM manager 160. In this regard, each block represents a module, segment, or portion of code, which comprises one or more executable instructions for implementing the specified logical function(s). It should also be noted that in some alternative implementations, the functions noted in the blocks may occur out of the order noted in FIG. 4. For example, two blocks shown in succession in FIG. 4 may in fact be executed substantially concurrently or the blocks may sometimes be executed in the reverse order, depending upon the functionality involved, as will be further clarified hereinbelow.

With reference to FIG. 4, it can be seen that change data reflecting changes in a voicemail system are received (402). This change data may be received via a GUI 269 or other user interface associated with the VM manager 160, for example. Further, this data may be received as an electronic format data file. A change data record is then generated based on the received change data (404). A second voicemail system is accessed via an administrative interface based upon data contained in an administrative access record associated with the second voicemail system and stored on an associated administrative database (406). The configuration database associated with the second voicemail system is modified in accordance with the change data record (408). These modifications preferably cause the configuration database to reflect the changes specified by the change data record. Access to the second voicemail system is then terminated (410). If there are additional voicemail systems on a particular voicemail system network 25 that have not yet had an associated network configuration database updated to reflect the changes contained in the change data record (412), the process repeats, from step 406, for another voicemail system. Otherwise, the process is complete (414).

The VM manager 160 of the present invention can be implemented in hardware, software, firmware, or a combination thereof. In the preferred embodiment(s), the VM manager 160 is implemented in software or firmware that is stored in a memory and that is executed by a suitable instruction execution system. If implemented in hardware, as in an alternative embodiment, the VM manager 160 can be implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a fully programmable gate array (FPGA), etc.

The software 205, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium-"can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

Therefore, having thus described the invention, at least the following is claimed:

1. A system for updating a voicemail system comprising:
   a voicemail (VM) manager processor for accessing an associated administrative database, said administrative database comprising a first administrative access record that specifies a first voicemail system and a first connection data for accessing a first voicemail box associated with said first voicemail system, and a second administrative access record that specifies a second voicemail system and a second connection data for accessing a second voicemail box associated with said second voicemail system;
   a controller configured to generate a change data record in accordance with received change data that specifies modified second connection data for accessing said second voicemail box;
   means for inputting said change data that specifies the modified second connection data for said second voicemail box of said second voicemail system such that said controller generates said change data record; and
   means for communicating said change data record in response to generation of said change data record to said first voicemail system such that said change data record changes a corresponding second connection data for accessing said second voicemail box associated with said second voicemail system, said corresponding second connection data residing in said first voicemail system.

2. The system of claim 1, wherein said first voicemail system is associated with a private branch exchange telephone system (PBX system).

3. The system of claim 1, further comprising storage memory for storing said change data record.

4. The system of claim 1, further comprising: an administrative interface associated with said first voicemail system; and
   a network coupling said controller and said administrative interface, such that said controller communicates said change data record to said administrative interface, via said network.

5. The system of claim 1, wherein said means for inputting said change data comprises a keyboard.

6. The system of claim 1, wherein said means for inputting said change data comprises a graphical user interface (GUI) associated with said controller.

7. The system of claim 4, wherein said network comprises a telephone network.

8. The system of claim 4, wherein said network comprises a wide area network.

9. The system of claim 4, wherein said network comprises the Internet.

10. The system of claim 1, further comprising:
    a first network configuration database associated with said first voicemail system, wherein said corresponding second connection data resides; and
    a first administrative interface associated with said first voice main system, said first administrative interface configured to receive said change data record from said means for communicating, and further configured to update said first network configuration database such that said corresponding second connection data is changed in accordance with said change data record.

11. The system of claim 10, wherein said controller is further configured to update said first network configuration database associated with said second voicemail system in accordance with said change data record.

12. The system of claim 2, wherein said change data record comprises data specifying a new extension added to said PBX system.

13. A method of updating a first voicemail system comprising the steps of:
    receiving change data by a voice mail (VM) manager reflecting changes made to a second connection data for a second voicemail box in a second voicemail system;
    updating said second connection data residing in a VM administrative database based upon said change data, said VM administrative database comprising a first administrative access record that specifies a first voicemail system and said first connection data for accessing a first voicemail box associated with said first voicemail system, and said VM administrative database further comprising a second administrative access record that specifies a second voicemail system and said second connection data for accessing said second voicemail box associated with said second voicemail system;
    generating a change data record specifying at least modified second connection data based upon said change data; and
    communicating said change data record in response to generation of said change data record to said first voicemail system such that said change data record changes a corresponding second connection data for accessing said second voicemail box associated with said second voicemail system, said corresponding second connection data residing in a first network configuration database residing in said first voicemail system.

14. The method of claim 13, further comprising the step of accessing said first network configuration database via an administrative interface coupled to said first voicemail system, such that said change data record is communicated in accordance with connection data specified by said VM administrative database.

15. The method of claim 14, further comprising the step of modifying said first network configuration database in accordance with said change data record.

16. The method of claim 14, further comprising the step of accessing said administrative interface, wherein said administrative interface is coupled to said first voicemail system and is associated with said second voicemail system via a configuration record residing in said first network configuration database.

17. The method of claim 16, further comprising the step of accessing said first network configuration database, wherein said first network configuration database is associated with said second voicemail system via said configuration record residing in said first network configuration database.

18. The method of claim 16, further comprising the step of specifying a connection data, wherein said connection data comprises a telephone number via which said administrative interface is accessed.

19. The method of claim 16, further comprising the step of specifying a connection data, wherein said connection data comprises an internet protocol (IP) address via which said administrative interface is accessed.

20. The system of claim 10, wherein said first administrative interface is further configured to update said first network configuration database associated with said first voicemail system such that a corresponding second configuration data associated with said second voicemail system is updated in accordance with said change data record.

21. The method of claim 14, further comprising the steps of:

receiving a second change data by said VM manager reflecting changes made to a third voicemail system;

updating a third connection data residing in said VM administrative database based upon said second change data, said VM administrative database further comprising a third administrative access record that specifies a third voicemail system and said third connection data for accessing a third voicemail box associated with said third voicemail system;

generating a second change data record based upon said second change data;

communicating said second change data record to said first voicemail system such that said second change data record changes a corresponding third connection data for accessing said third voicemail box associated with said third voicemail system, said corresponding third connection data residing in said first network configuration database; and communicating said second change data record to said second voicemail system such that said second change data record changes another corresponding third connection data for accessing said third voicemail box associated with said third voicemail system, said another corresponding third connection data residing in a second network configuration database.

22. A system for updating a voicemail system comprising:

a first voicemail system comprising:
a plurality of first voicemail boxes;
a first network configuration database specifying a plurality of first connection data, each one of the first connection data uniquely identifying each of the first voicemail boxes; and
a first administrative interface that accesses the first network configuration data base;

a second voicemail system comprising:
a plurality of second voicemail boxes;
a second network configuration database specifying a plurality of second connection data, each one of the second connection data uniquely identifying each of the second voicemail boxes; and
a second administrative interface that accesses the second network configuration data base;

wherein the first network configuration database additionally specifies the plurality of second connection data, and wherein the second network configuration database additionally specifies the plurality of first connection data; and a voicemail manager configured to generate a change data record specifying a change to the first connection data, configured to communicate the change data record to the first administrative interface such that the first connection data is residing in the first network configuration database changed in accordance with the change specified in the change data record, and configured to communicate the change data record to the second administrative interface such that the first connection data residing in the second network configuration database is changed in accordance with the change specified in the change data record.

23. The system of claim 22 wherein the first connection data comprises a telephone number.

24. The system of claim 22 wherein the first connection data comprises an Internet protocol address.

25. The system of claim 23 wherein the voicemail manager comprises an administrative database wherein data corresponding to at least the plurality of first connection data and the plurality of second connection data resides.

* * * * *